(No Model.)

D. J. DENSMORE & W. H. BRIGGS.
FOLDING OPERA GLASSES.

No. 567,890. Patented Sept. 15, 1896.

WITNESSES:
W. H. Haywood
L. Wenke

INVENTORS
Daren J. Densmore
and William H. Briggs
BY
Howson & Howson
their ATTORNEYS

UNITED STATES PATENT OFFICE.

DARSA J. DENSMORE AND WILLIAM H. BRIGGS, OF BROOKLYN, NEW YORK.

FOLDING OPERA-GLASS.

SPECIFICATION forming part of Letters Patent No. 567,890, dated September 15, 1896.

Application filed February 3, 1896. Serial No. 577,849. (No model.)

*To all whom it may concern:*

Be it known that we, DARSA J. DENSMORE and WILLIAM H. BRIGGS, citizens of the United States of America, residing in Brooklyn, Kings county, New York, have invented Improvements in Folding Opera-Glasses, of which the following is a specification.

Our invention consists of certain improvements in the construction of opera-glasses designed to be folded up into a small compass convenient for carrying in the pocket or otherwise.

Figure 1:
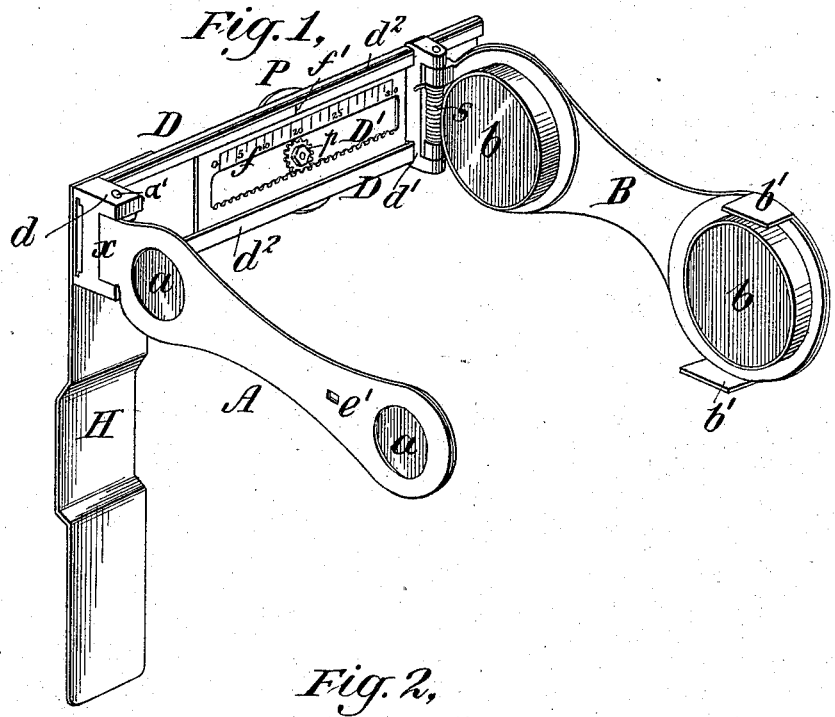
Figure 2:
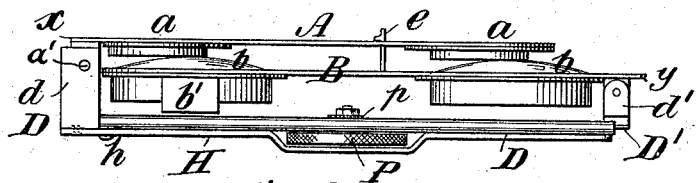
Figure 3:
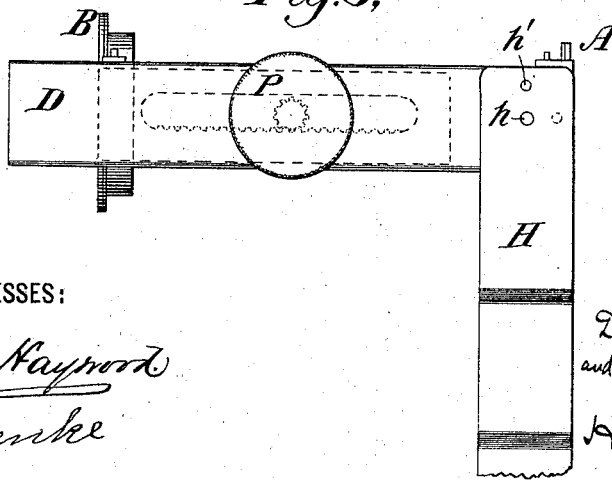

In the accompanying drawings, Figure 1 is a perspective view of an opera-glass as opened out for use. Fig. 2 is a side or edge view of the same when folded up for carrying; and Fig. 3 is a side elevation of the glass when opened out, as in Fig. 1.

The small lenses $a\,a$ are mounted in a suitable lens-frame A, while the large lenses $b\,b$ are mounted in a corresponding lens-frame B, and these frames are hinged at corresponding ends to supporting-slides D and D', adapted to move longitudinally one upon the other to adjust the pairs of lenses (when opened out, as shown in Fig. 1) nearer to or farther away from each other for focusing. In the case illustrated I have shown one end of the lens-frame A hinged at $a'$ to a laterally-projecting arm $d$ of the slide D, which is shown as provided with longitudinal flanges $d^2\,d^2$, in which is guided the shorter slide D'. To a projection $d'$ on the outer end of this slide D' is hinged that end of the lens-frame B which corresponds with the hinged end of the frame A. The hinging of both these lens-frames to their respective slides is such that the frames can be folded down onto the slides and close one upon the other, as shown in Fig. 2, but spiral or other springs, such as $s$, Fig. 1, are provided, tending to fold the lens-frames outward to positions at right angles to the slides D D' and parallel with each other, as shown in Fig. 1. The lens-frames cannot go beyond the positions shown in Fig. 1 at right angles to the supporting-slides, owing to stops $x$ and $y$ on the frames, Fig. 2, coming into contact with shoulders on the projections to which the frames are hinged.

To keep the parts in the folded-up position shown in Fig. 2, a spring-catch $e$, Fig. 2, on the back of the lens-frame B may engage with a shoulder on the frame A, passing through a slot $e'$ on the frame A, Fig. 1, for that purpose.

For convenience in adjusting the lens-frames a pinion $p$, mounted in bearings in the slide D and having a milled head P, may be provided to engage with a rack in the slide D', as shown in Fig. 1. On one slide may be provided a graduated scale $f$ and on the other an index-mark $f'$, Fig. 1, for convenience of the user in focusing, since after once using the glass he will be enabled to know what adjustment suits his eyesight best. We prefer also to provide the lens-frame B with finger-pieces $b'$ for convenience in holding the glass when in use, particularly for focusing. A hinged handle H may also be provided on the supporting-slides. Thus in the drawings we have shown a metal handle H as hinged at one end $h$ to the back of the slide D in such a way that it can be folded up parallel with the back of the slide D, as shown in Fig. 2, or at right angles thereto, as shown in Figs. 1 and 3.

The handle may be frictionally maintained in either position by any suitable means, such as a projection $h'$ on the inner face of the handle entering one or other of two openings $i$, made in the back of the slide D to receive the projection.

We claim as our invention—

1. An opera-glass comprising supporting-slides adjustable one upon the other, and two frames each carrying a pair of lenses and each hinged at one end to one of the slides so as to fold down on the latter, substantially as described.

2. An opera-glass comprising supporting-slides adjustable one upon the other with rack-and-pinion adjustment, and two frames each carrying a pair of lenses and each hinged at one end to one of the slides, so as to fold down on the latter, substantially as described.

3. An opera-glass comprising supporting-slides adjustable one upon the other and two frames, each carrying a pair of lenses and each hinged at one end to one of the slides a catch to retain them in the closed position and springs tending to fold the lens-frames out to positions at right angles to the slides, substantially as described.

In testimony whereof we have signed our names to this specification in the presence of two subscribing witnesses.

DARSA J. DENSMORE.
WILLIAM H. BRIGGS.

Witnesses:
EDITH J. GRISWOLD,
HUBERT HOWSON.